UNITED STATES PATENT OFFICE.

MARC WILMOT FINK, OF MIDDLE BRIGHTON, AND ADOLF MARTIN KOBIOLKE, OF KEW, VICTORIA, AUSTRALIA.

BEAD FOR PNEUMATIC OR OTHER TIRES.

1,158,194.             Specification of Letters Patent.        Patented Oct. 26, 1915.

Application filed February 19, 1914.   Serial No. 819,766.

*To all whom it may concern:*

Be it known that we, MARC WILMOT FINK and ADOLF MARTIN KOBIOLKE, citizens of the Commonwealth of Australia, residing at "Melrose," St. Kilda street, Middle Brighton, in the State of Victoria and said Commonwealth, and 18 Gordon avenue, Kew, State of Victoria, aforesaid, respectively, have invented an Improved Bead for Pneumatic or other Tires, of which the following is a specification, reference being had therein to the accompanying drawing.

Hitherto the beads of motor and like tires have been formed with a rubber or wire core and canvas lining, and not having the required strength, are liable to break on any extra strain being imparted to the tire, causing the same to part from the wheel and rendering the occupants of the vehicle liable to accident and injury.

This invention has been devised in order to provide a bead for pneumatic or other tires constructed in such a manner that strength will be combined with flexibility and the risk of accidents will be obviated.

According to this invention the beading is formed of a leather, rubber or other core with an outer cover or lining of leather, the shape corresponding to the shape desired on the inner edges of the cover. The core and lining is impregnated with rubber before being placed in the mold and vulcanized. The beading is formed of one or more strips of leather of suitable strength and thickness arranged so that the core will pass approximately centrally around the inner ends of the tire cover.

In order that the invention may be more readily understood, it will now be described with reference to the accompanying drawings, in which—

Figures 1, 2:
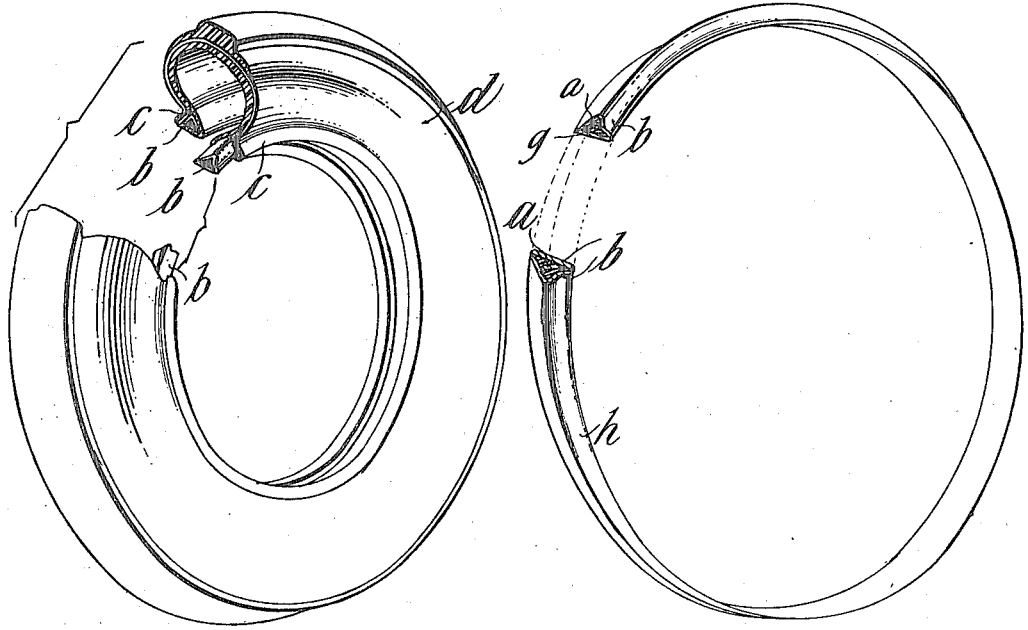
Figure 3:
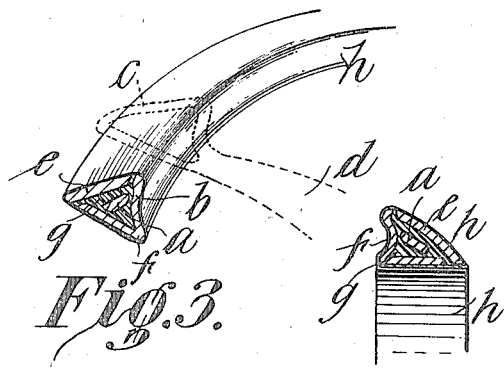
Figure 4:
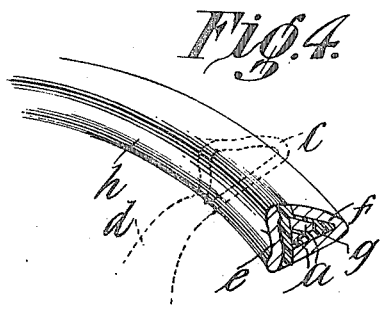
Figure 6:
Figure 5:

Figure 1 is a sectional view in perspective of a pneumatic tire cover having beads constructed according to this invention embodied therein. Fig. 2 is a sectional view in perspective of a bead constructed according to this invention. Fig. 3 is an enlarged sectional view in perspective of the bead illustrated in Figs. 1 and 2. Fig. 4 is an enlarged sectional view in perspective, and Fig. 5 is an enlarged view in cross section of a modified form of construction. Fig. 6 is an enlarged view in cross section of the beading illustrated in Figs. 1, 2 and 3.

Like reference letters indicate the same or corresponding parts in all the figures.

According to this invention, the beading is formed of a leather core *a*. This core is made up of a single strip of leather as illustrated or of a plurality of pieces joined together. The core *a* is provided with an outer cover or lining *b* of leather, both being impregnated with rubber before being placed in the mold and vulcanized.

The beading may be formed with one or more strips of leather of suitable strength and thickness arranged so that the core passes approximately centrally within the inner ends *c* of the tire cover *d* as above described.

The core *a* is lined or provided with a cover of leather of suitable thickness or strength which may be formed of two or more separate strips of leather *e*, *f* and when two strips of leather are employed, the outer strip is of sufficient strength to overcome any stress that may be exerted against it, while the inner side of the leather cover or lining is of suitable flexibility.

In this construction, one side of the bead consists of the leather strip *e* while the other sides consist of a V or U shaped strip *f*, while the core may consist of one or more leather strips *a*, the whole being impregnated with rubber, and is pressed into its required shape in the mold during the vulcanizing operation. The bead *a* so formed is built up as above described and the spaces between the core *a* and its leather lining *b* are filled with rubber compound *g* and an outer surface of rubber *h* is also vulcanized to the bead.

Beads constructed as above described are attached to a tire or cover in any suitable manner and they may be constructed of varying strengths if desired.

In lieu of forming the leather cover or lining *b* of the core *a* in two pieces or strips, it may be formed of one piece, the V or U strip *f* being extended around the whole of the core *a* in a manner of a circle or triangle and by the pressure in a mold during the vulcanizing operation, takes the required shape and forms the bead.

The leather is impregnated with the rubber by any known process.

It will be obvious that a bead constructed as above described may be readily fitted to tires of ordinary construction while at the same time it is strong and flexible and capable of withstanding any stress that is likely to be imparted thereto, thus tending to obviate the risks of accidents that are sometimes caused through the faulty beads at present in use.

What we claim as our invention and desire to secure by Letters Patent, is—

1. A molded and vulcanized tire bead made up of a rubber body, a reinforcing leather strip embedded in the body and extending longitudinally throughout the same, and a leather cover for the body.

2. A molded and vulcanized tire bead comprising a rubber body of substantially triangular cross-section, a leather reinforcing strip embedded in the body and extending longitudinally throughout the same, and a leather cover for the body, said cover including two longitudinal strips, one of the strips being substantially V-shaped in cross-section.

In testimony whereof we affix our signatures in the presence of two witnesses.

MARC WILMOT FINK.
ADOLF MARTIN KOBIOLKE.

Witnesses:
SIDNEY HENDLEY,
ANNIE EDWARDS.